(12) United States Patent
Barnhart

(10) Patent No.: US 7,747,472 B2
(45) Date of Patent: Jun. 29, 2010

(54) HIDDEN IMAGE GAME PIECE

(75) Inventor: Thomas L. Barnhart, Atlanta, GA (US)

(73) Assignee: WS Packaging Group, Inc., Algoma, WI (US)

( * ) Notice: Subject to any disclaimer, the term of this patent is extended or adjusted under 35 U.S.C. 154(b) by 277 days.

(21) Appl. No.: 11/474,616

(22) Filed: Jun. 26, 2006

(65) Prior Publication Data

US 2007/0005430 A1    Jan. 4, 2007

Related U.S. Application Data

(63) Continuation of application No. 10/411,363, filed on Apr. 11, 2003, now abandoned, which is a continuation of application No. 09/480,656, filed on Jan. 11, 2000, now Pat. No. 6,629,888, which is a continuation of application No. 09/437,254, filed on Nov. 10, 1999, now Pat. No. 6,296,900, which is a continuation of application No. 09/081,795, filed on May 20, 1998, now Pat. No. 5,984,367.

(51) Int. Cl.
*G06Q 40/00* (2006.01)

(52) U.S. Cl. .............................. 705/26; 705/1; 705/14; 705/10; 705/27; 707/10; 707/100; 463/16; 463/17; 463/31; 283/72

(58) Field of Classification Search .................... 705/1, 705/14, 10, 27; 707/10, 100; 463/16, 17, 463/31; 283/72
See application file for complete search history.

(56) References Cited

U.S. PATENT DOCUMENTS 5,938,727 A * 8/1999 Ikeda .......................... 709/218
5,996,997 A * 12/1999 Kamille ....................... 273/139

* cited by examiner

*Primary Examiner*—Daniel S Felten
(74) *Attorney, Agent, or Firm*—Reinhart Boerner Van Deuren s.c.

(57) ABSTRACT

A hidden image game piece and a method by which a hidden image game piece is produced. A first pattern of colored ink is deposited on a transparent or highly translucent substrate at 110-180 density, forming the image which is to be hidden. Then a second pattern of colored ink, of a different color than first pattern's ink, is deposited upon the substrate on top of the first pattern, at 90-170 density. When the game piece is flooded with additive light of the same color as the second pattern's ink, the previously concealed image, composed of the first pattern's ink, becomes perceptible. Because a transparent or highly translucent substrate is used for the game piece, and because the density of the ink application is controlled within specific ranges, this game piece may be used with a computer monitor, or with other low-intensity sources of additive light.

20 Claims, 5 Drawing Sheets

HIDDEN IMAGE GAME PIECE

CROSS-REFERENCE TO RELATED APPLICATIONS

This patent application is a continuation of U.S. patent application Ser. No. 10/411,363, filed on Apr. 11, 2003 now abandoned (the "'363 Application"), entitled "Hidden Image Game Piece," which is a continuation of U.S. patent application Ser. No. 09/480,656, filed on Jan. 11, 2000, now U.S. Pat. No. 6,629,888, granted on Oct. 7, 2003 (the "'888 Patent"), entitled "Hidden Image Game Piece, which in turn is a continuation of U.S. patent application Ser. No. 09/437,254, filed on Nov. 10, 1999, now U.S. Pat. No. 6,296,900, granted Oct. 2, 2001 (the "'900 Patent"), entitled "Method of Making Hidden Image Game Piece, which in turn is a continuation of U.S. patent application Ser. No. 09/081,795, filed on May 20, 1998, now U.S. Pat. No. 5,984,367, granted Nov. 16, 1999 (the "'367 Patent"), entitled "Hidden Image Game Piece. The '363 Application, the '888 Patent, the '900 Patent, and the '367 Patent are all hereby incorporated herein by reference.

BACKGROUND OF THE INVENTION

Field of the Invention

This invention relates to game pieces, specifically to printed game pieces which reveal concealed information when exposed to an additive light source.

In numerous types of situations and environments it is desirable or necessary to provide a substrate which carries a hidden image. That hidden image might be a word, number, icon, logo, drawing, picture, depiction, marking, message, pattern, or some other indicia. For example, when a sheet with a hidden image is used as a game piece, its hidden image, once revealed, may be used to: (a) communicate the name of a particular prize in a sweepstakes; (b) communicate a particular number which has to be matched identically to a predetermined "winning" number in order to win a prize; (c) communicate a particular word which has to be matched identically to a predetermined "winning" word in order to win a prize; or (d) communicate a particular image, picture, logo, or icon in order to win a prize.

Often, there is a predetermined "seeding" structure inherent in a game-piece-delivered sweepstakes in which only a certain predetermined number of "winning" game pieces are printed and distributed for each corresponding prize level. However, because the game piece's potentially "winning" information is hidden, no contest participant has a chance to win unless he or she interacts with a game piece to reveal its concealed image There are numerous ways to create a substrate which carries a hidden image; all of these techniques could theoretically be used to create a game piece with a hidden image. For example, in some merchandising schemes a hidden image is present on a substrate and can be read only after a coating is removed by scratch removal of the coating or other removal of the coating. Some types of hidden images on a substrate appear only after a chemical solution is applied to the substrate. Some types of hidden images which are carried by a substrate appear only after a reaction occurs in the image when the substrate is subjected to artificial or natural light. Some types of hidden images which are carried by a substrate are made to appear only after the substrate is subjected to a significant temperature change. Some types of hidden images which are carried by a substrate are made visible only when observed in special kind of light rays. Some types of hidden images which are carried upon a substrate are made visible for reading only when viewed through special optics. Several other methods for applying and for reading hidden images have been created.

Devices have been created in which a hidden image carried upon a substrate will only become visible when exposed to specific color(s) of light in the visible spectrum. Typically, such devices are created by using printing, or some other technique, to apply images to the substrate. For example, the image which is to be hidden may be applied to the substrate using one color. Then the marking, pattern, or image which has been designed to conceal the hidden image may be applied to the same portion of the substrate as the hidden image, using a different color. Generally, the concealing marking, pattern, or image is designed to cover, surround, or otherwise camouflage the concealed image in a way that makes the concealed image imperceptible in normal light. Often, a "mezzotint" pattern is used for the concealing marking, pattern, or image ("mezzotint" refers to a computer-generated pattern which has red and yellow elements; such a pattern is often used to disguise an image printed in light blue). An image which has been hidden in this manner may be revealed by exposing the substrate to light of a color similar to the concealing marking, pattern, or image.

However, all of the presently known methods for creating a light-activated hidden image game piece have proved unsuitable for creating a hidden image game piece which is capable of being activated by the low-intensity light emanated by a typical computer monitor screen. In the past, light-activated hidden image game pieces have typically: 1) employed a paper substrate; 2) not required that the density of the inks applied to the substrate be limited to a specific range; and 3) used a coloring filtering device to provide the specific color of light required to activate the game piece.

A number of game pieces have been created in which a previously hidden image will be revealed when the game piece is viewed through a color filtering device. A color filtering device tends to prevent the transmission of light rays of a substantially different color than the filtering device. For example, if the primary color red is used for the filter, it will absorb light of the other primary colors blue and green. Accordingly, objects which are otherwise blue or green will appear black (in the absence of light transmission); red objects will remain red; white objects will also be seen as red, as the blue and green components of the white light are absorbed by the filter. Accordingly, on a white background, an image in blue may be surrounded and camouflaged by red markings so as to appear substantially illegible when viewed with the naked eye. When viewed through a red filter, however, the image can be seen as a black image on a solid red background. U.S. Pat. No. 5,312,656, to Michaels, shows the use of red filter (specifically, a transparent red plate in a toy picnic set) to reveal a hidden image in this way. A similar use of a red filter to reveal a hidden image is described in U.S. Pat. No. 5,401,032, to Barnhart and Smith.

However, an approach other than the color-filtering technique is required when designing a hidden-image game piece capable of being activated by a device such as a computer monitor. A color filter uses ambient natural or artificial light, and screens out those colors of light which are undesired. But it is also possible to "add" light of a specific color to a game piece, without filtering the ambient light. In the case of a computer monitor, the "additive" light needed for activation of the game piece may be obtained by placing the game piece on a specifically-colored area of the screen of an operating monitor. This action floods the game piece with the specific type of colored light required for activation, and reveals the hidden image.

By way of example, it would be possible to make a paper game piece which was designed to be activated by red light when placed upon a television screen In such a game piece, a printed red and yellow mezzotint pattern could be used to conceal a hidden image printed in light blue. When such a game piece was flooded with the additive red light supplied by a red square projected on the television screen from the source of transmission, the game piece's hidden message would be seen as a black image on a red background.

However, a paper game piece designed to be activated by a relatively high-intensity light source, such as a television, cannot be used with a relatively low-intensity light source, such as a computer monitor. The intensity of the additive light provided by a computer monitor is generally only 80-120 candlepower (the intensity a source of light is measured in standard units known as "candlepower;" one candlepower is equal to the light emitted by one standardized candle). A computer monitor's low-intensity light cannot activate a hidden-image paper game piece because it cannot overcome the papers opacity to reveal the hidden image. Therefore, a traditional paper substrate cannot be used to create an additive-light game piece designed to be activated by a computer monitor.

In the past, the density of the ink application used in printing an additive-light activated hidden image game piece has been of relatively minor importance. However, when producing an additive-light activated hidden image game piece which is designed for use with computer monitors, or other devices which emanate relatively low levels of additive light, the density of the ink application must be controlled within a narrow range. If the density is too high, it will serve to block the additive light needed to reveal the hidden image. If the density is too low, the hidden image and/or the concealing image will be illegible.

In the printing industry, "density" is a term of art. It refers to the thickness of a coating (typically, ink) which is applied to a substrate. One unit of density equals {fraction (1/100,000)} (one one-hundred thousandth) of an inch of coating thickness. Therefore, density of 100 equals {fraction (1/1000)} (one one-thousandth) of an inch of coating thickness, or one mil. Printers typically use a tool known as a "densitometer" to measure coating thickness.

The phrase "dull coating" is also a term of art in the printing industry. It is often used interchangeably with the terms "dull varnish" and "frost coating." It refers to a coating which is traditionally used by printers to enhance the appearance and durability of printed matter. Such a coating may be oil-based or water-based. A water-based dull coating is commonly referred to as an "aqueous" coating.

SUMMARY OF THE INVENTION

The present invention is a game piece with a hidden image, and a method for producing such a game piece. To create the game piece, a first pattern of colored ink is deposited on a transparent or highly translucent substrate at 110-180 density to form an image. Then a second pattern of colored ink, of a different color than first pattern's ink, is deposited upon the substrate at 90-170 density and over at least a portion of the first pattern. When the game piece is flooded with additive light of the same color as the second pattern's ink, the previously concealed image, composed of the first pattern's ink, becomes perceptible. Because a transparent or highly translucent substrate is used for the game piece, and because the density of the ink application is controlled with certain ranges, this game piece may be used with a computer monitor, or other low-intensity source of additive light.

Several objects and advantages of the present invention are: (a) to provide an additive-light activated hidden image game piece which will reveal its hidden image when exposed to relatively low levels of additive light, such as those typically emanated by a computer monitor; (b) to provide a method of producing an additive-light activated hidden image game piece which will reveal its hidden image when exposed to relatively low levels of additive light, such as those typically emanated by a computer monitor; and c) to provide a method of producing an additive-light activated hidden image game piece which creates high quality products.

Other objects and advantages of this invention will become apparent from a consideration of the ensuing description and drawings.

DESCRIPTION OF THE DRAWINGS

In the drawings, closely related figures have the same number but different alphabetic suffixes.

DETAILED DESCRIPTION OF THE PREFERRED EMBODIMENT

Figure 1A:
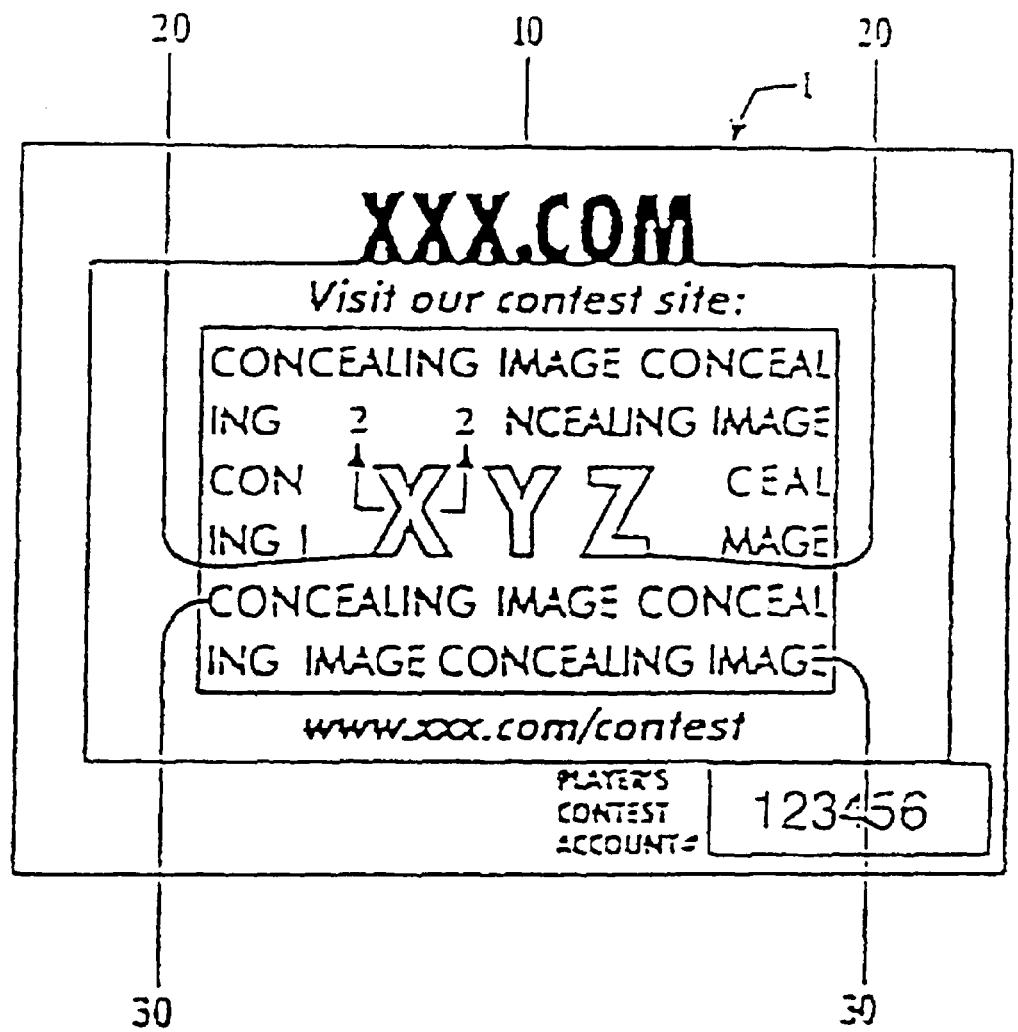
FIG. 1A is a plan view of a substrate to which a hidden image has been applied in accordance with this invention, with the hidden image shown revealed.

FIG. 1A shows a transparent or translucent substrate 10. In the preferred embodiment, a transparent substrate is employed, though the game piece will work with a highly translucent substrate. Specifically, good results may be may be obtained by using a transparent polyester substrate of 4 mil thickness or greater (a "mil" is {fraction (1/1000)} of an inch). A transparent or highly translucent compact disc (CD) may also be employed as a substrate, and turned into a game piece by using the techniques described herein. If a transparent or translucent CD is used as a substrate, it should be noted that only discs which have not been aluminized (or have been only partially aluminized) are suitable for this process.

Also in FIG. 1A, a concealed image 30 is applied to the surface of the substrate 10 by printing the concealed image 30 in a coating material, such as ink. In the preferred embodiment, the concealed image 30 is applied in high density fluorescent yellow ink at 120-140 density. A concealing image 20 is applied to the substrate 10 on top of the concealed image 30 by printing the concealing image 20 in a coating material, such as ink. In the preferred embodiment, the concealing image 20 is applied in high density fluorescent process cyan ink at 140-150 density. These elements have been combined to form an exemplary game piece 1.

Figure 3:
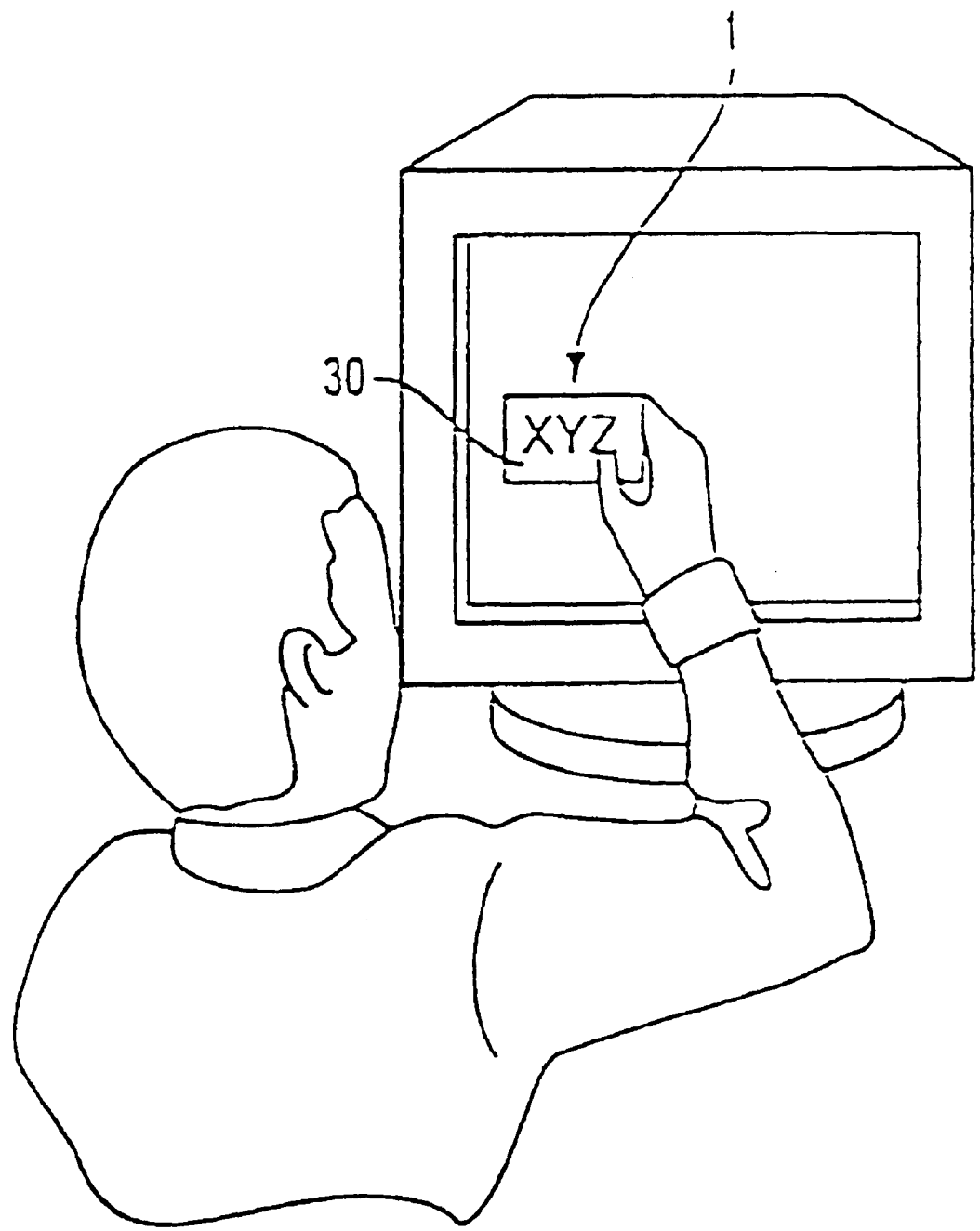
FIG. 3 is a plan view drawn on a larger scale than the other figures, demonstrating a manner of revealing a hidden image which has been applied to a substrate in accordance with the principles of this invention.

Additionally, FIG. 1A shows the result when the exemplary game piece 1 is exposed to a blue additive light source—the concealed image 30 is revealed. FIG. 3 shows a typical manner of obtaining the additive blue light needed to reveal the game piece's hidden image. In FIG. 3, the exemplary game piece 1 has been placed on a blue area of the screen of an operating computer monitor, revealing the concealed image 30.

Figure 1B:
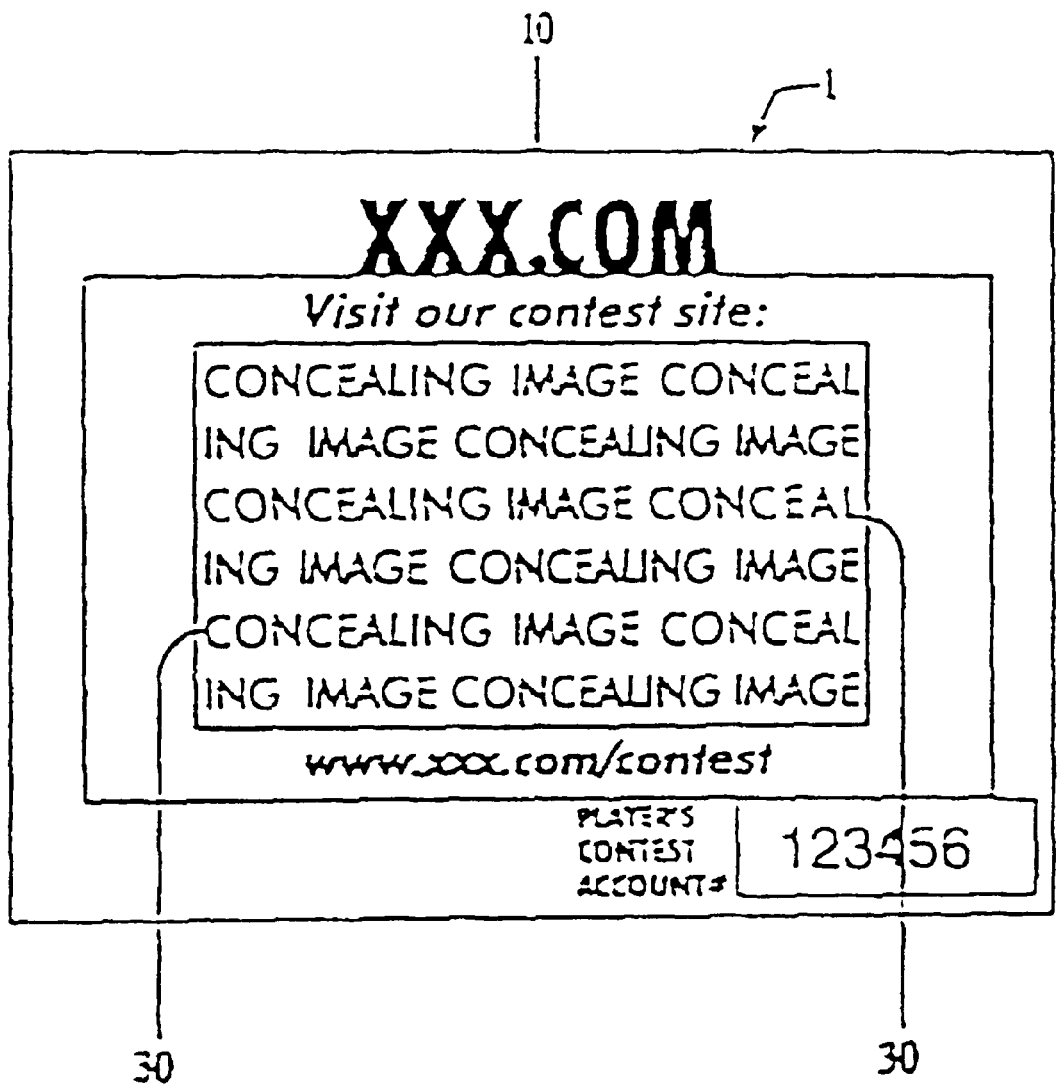
FIG. 1B is a plan view of a substrate to which a hidden image has been applied in accordance with this invention, with the hidden image shown concealed.

FIG. 1B shows the same transparent or translucent substrate 10 as FIG. 1A, and the same concealing image 20 as FIG. 1A, components of the same exemplary game piece 1 as FIG. 1A. However, the concealed image 30 of FIG. 1A is not visible in FIG. 1B, as the printed substrate has not been exposed to a blue additive light source.

Figure 2:
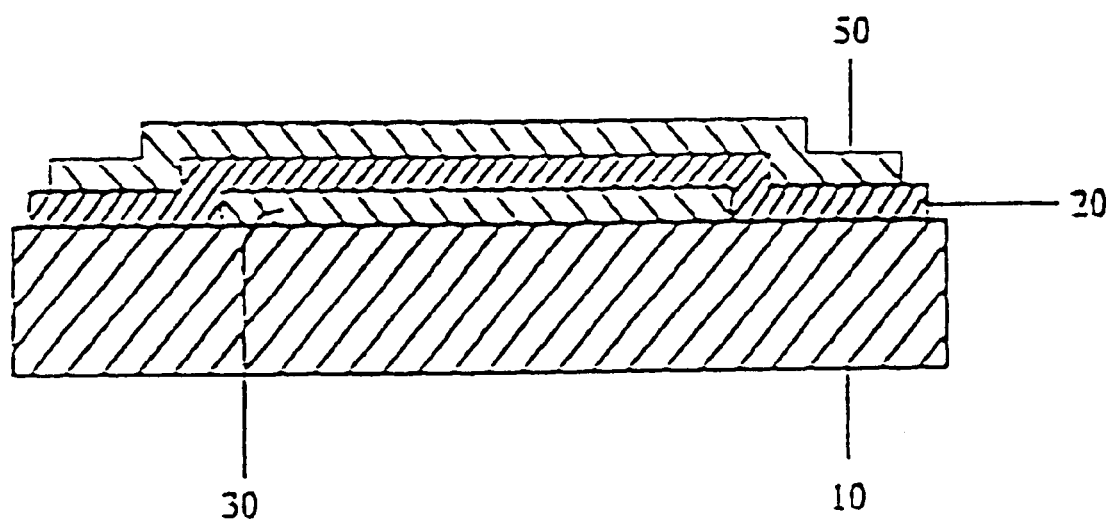
FIG. 2 is a section view of the substrate shown in FIG. 1A.

FIG. 2 is a section view of the printed substrate shown in FIG. 1A. FIG. 2 shows the transparent or translucent substrate 10, the concealed image 30, and the concealing image 20. FIG. 2 also shows the dull coating 50, which may be applied on top of the printed layers over the entire substrate 10. Though it is theoretically possible to manufacture the game piece without application of the dull coating, far superior results will be obtained if the coating is used. In the past, dull coatings have been used by printers to enhance their final product in two ways: in order to keep the print from smudging, and to give the printed matter a "finished" appearance. But in the current invention, the dull coating has a different primary purpose. In the game piece, the dull coating serves to reduce the reflectivity of the substrate, and to reduce the contrast between the substrate and the printed matter. Therefore, application of the dull coating to the game piece makes it virtually impossible to detect the game piece's hidden message without additive-light activation.

Figure 4:
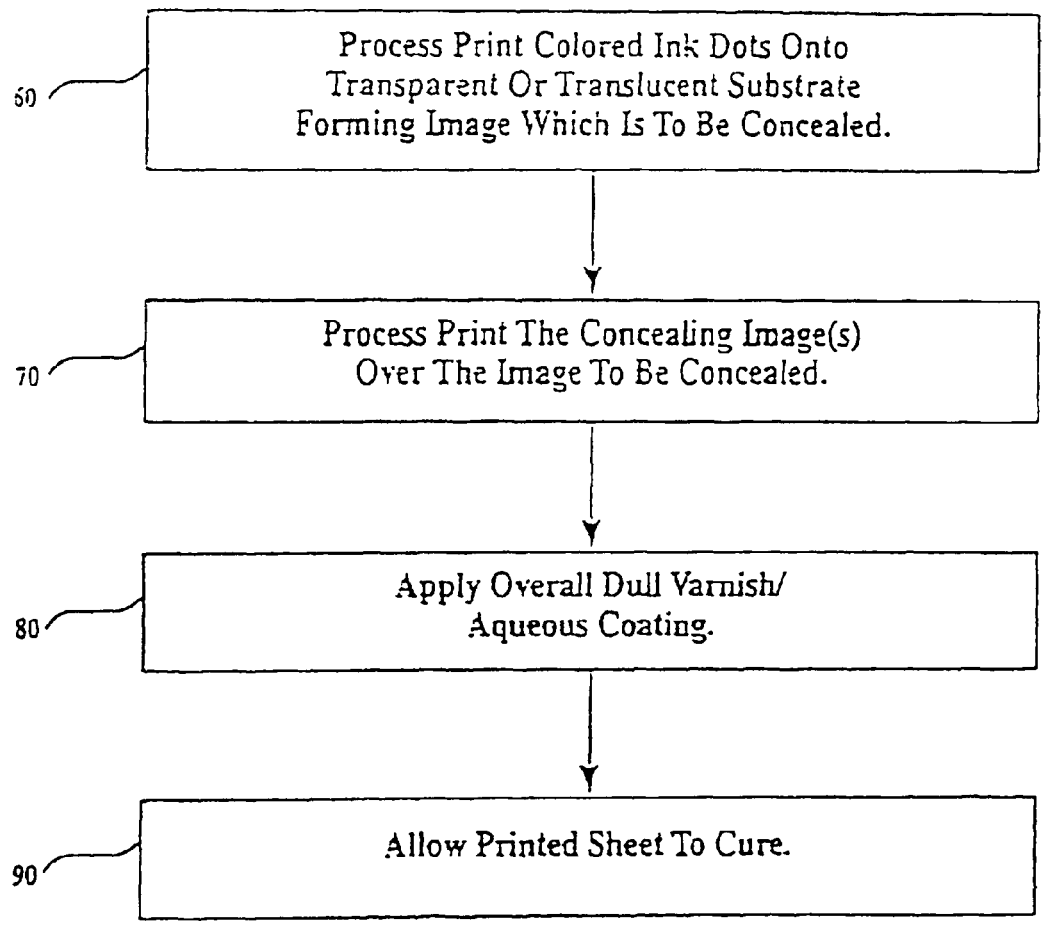
FIG. 4 is a block diagram of the method of manufacturing the present invention.

FIG. 4 is a block diagram showing the method of manufacturing the present invention. Block 60 contains the first step in manufacturing the game piece—forming the image which is to be concealed. In this step, the image to be concealed is created by process printing colored ink dots on to a transparent or translucent substrate. For best results, a transparent or highly translucent substrate should be used, and the image should be applied at 120-140 density, using high density fluorescent yellow ink.

Block 70 contains the second step in manufacturing the game piece—process printing the concealing image(s) over the image to be concealed. At a minimum, these concealing image(s) should be applied as a second layer in the area of the image to be concealed. However, the concealing image(s) may be applied over as much of the game piece as desired. Use colored ink dots of a different color than the ink dots which were used to create the image to be concealed, and of approximately the same color as the additive light source which will be used to reveal the game piece's hidden image. For best results, use high density fluorescent cyan ink applied at 140-150 density. In addition, it may be desirable during this step of the process to apply any other printed matter (i.e., other than the concealed and concealing image) which is to appear on the game piece.

Block 80 contains the third step in manufacturing the game piece—applying an overall dull coating to the game piece. This step is not strictly necessary, but far superior results will be obtained if the dull coating is used. Use of the dull coating makes the hidden message of the game piece virtually undetectable until the game piece is exposed to additive light of the correct color for activation. For best results, an aqueous dull coating should be used.

Block 90 contains the fourth step in manufacturing the game piece—allowing the printed substrate to cure for 72 hours.

Operation

FIG. 1B shows an exemplary embodiment of the present invention as it appears in the absence of blue additive light. In this exemplary embodiment, the invention takes the form of contest game piece 1. FIG. 1B's concealing image 20, printed in high density fluorescent cyan ink, masks the game piece's concealed image.

In FIG. 1A, the result of exposing the same exemplary contest game piece 1 to a source of blue additive light is shown—the game piece's concealed image 30 is revealed. A typical manner of obtaining the blue additive light needed to reveal the game piece's concealed image is shown in FIG. 3. In FIG. 3, the game piece 1 has been laid flat on a blue area of the screen of an operating computer monitor, thereby flooding it with additive blue light. In the specific context of a contest game piece, the blue screen area utilized to flood the game piece with additive blue light might be a feature of an internet web site page (or pages) specifically designed for the contest.

When the game piece 1 is flooded with additive blue light, the game piece's hidden message appears as dark gray on a blue background. In the exemplary embodiment, this is because one primary color (cyan; i.e., blue) has been used to create the concealing image, while another primary color (yellow) has been used to create the concealed image. As the concealing image is printed in blue-based cyan, the background continues to appear blue when the exemplary game piece is flooded with additive blue light. However, the concealed image, which is printed in yellow, now appears as dark gray. This is because, by definition, the additive blue light lacks the yellow light a viewer would require in order to perceive the hidden image as yellow. Therefore, because the game piece is flooded with blue light only, the yellow concealed image appears to darken substantially, and becomes perceptible.

CONCLUSION, RAMIFICATIONS, AND SCOPE

In its exemplary form, the present invention is an additive-light activated game piece which has been specifically designed to be activated by a computer monitor. Previous light-activated hidden-image game pieces have generally been made of paper, and have generally required a color filter for activation. Thus, previous light-activated hidden-image game pieces were unsuitable for use with computer monitors, or other relatively low-level sources of light. In particular, no light-activated game piece suitable for interaction with an internet web site has previously been available.

The present invention solves that problem. It is created by applying a series of printed layers, each layer being of a specific color and density, to a transparent or translucent substrate, in a certain predetermined sequence.

By using the present invention, consumers are able to interact with an organization's internet web site in the context of a sweepstakes, contest, or other promotion. This interaction is highly desired by organizations, who wish to attract consumers to their web sites. Often, such web sites contain information promoting a particular company's products, and/or provide the consumer with an opportunity to purchase company products. When an organization provides consumers with additive-light activated contest game pieces designed to interact with that organization's web site, it can vastly increase the "traffic" at that site. Consumers will visit the web site to see if they have won a prize, and will thereby be exposed to the information and purchase opportunities available at that web site. The present invention makes this type of promotional activity possible because, unlike previous light-activated game pieces, it can be activated by a computer monitor.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method for increasing web site traffic using a computer having a computer monitor screen, the method comprising:
   providing a game piece to at least one individual;
   providing a web site having a page which is displayed on the monitor screen of the computer, allowing the individual to interact with the web site with the game piece, wherein in interacting with the web site and the game piece, the individual places the game piece onto the monitor screen of the computer;
   providing one of the game piece and the page of the web site with a selectively camouflaged image that is viewable using the other of the game piece and the page of the web site; and
   revealing the selectively camouflaged image when the individual places the game piece onto the monitor screen of the computer, exposing the game piece to light emanated by the computer monitor, to allow the individual to determine a winning status of the game piece.

2. A method as defined in claim 1, including providing the game piece with the selectively camouflaged image that is viewable using the page of the web site.

3. A method as defined in claim 2, further comprising the step of:
   providing the page of the web site with at least one region consisting essentially of a primary color.

4. A method as defined in claim 1, including providing the page of the web site with the selectively camouflaged image that is viewable using the game piece.

5. A method as defined in claim 4, further comprising the step of:
   providing the game piece with at least one region consisting essentially of a primary color.

6. A method as defined in claim 1, wherein the selectively camouflaged image comprises information relating to a contest.

7. A method as defined in claim 1, wherein the selectively camouflaged image comprises information relating to a promotion.

8. A method as defined in claim 1, wherein the selectively camouflaged image comprises information relating to a sweepstakes.

9. A method as defined in claim 1, wherein the game piece comprises a compact disc.

10. A method as defined in claim 1, wherein the web site is associated with a particular company, and wherein at least one of the game piece and the page of the web site includes information promoting the particular company's products and/or providing the individual with an opportunity to purchase the particular company's products.

11. A method for increasing web site traffic using a computer having a computer monitor screen, the method comprising:
    providing an additive light-activated game piece to at least one individual, the game piece designed to be activated by light emanated by the computer monitor when the game piece is placed in proximity to the monitor screen of the computer while the computer monitor is operating;
    providing a web site having a page which is displayed on the monitor screen of the computer, allowing the individual to interact with the web site with the game piece;
    providing one of the game piece and the page of the web site with a selectively camouflaged image that is viewable using the other of the game piece and the page of the web site; and
    revealing the selectively camouflaged image when the individual places the game piece in proximity to the monitor screen of the computer, exposing the game piece to light emanated by the computer monitor, to allow the individual to determine a winning status of the game piece.

12. A method as defined in claim 11, including providing the game piece with the selectively camouflaged image that is viewable using the page of the web site, wherein the camouflaged image includes a concealed image applied to a substrate and a concealing image applied to the substrate on top of the concealed image, masking the concealed image, and wherein the step of revealing the concealed image includes exposing the game piece to light emanated by the monitor screen, whereby the concealed image becomes perceptible.

13. A method as defined in claim 12, further comprising the step of:
    providing the page of the web site with at least one region consisting essentially of a primary color.

14. A method as defined in claim 11, including providing the page of the web site with the selectively camouflaged image that is viewable using the game piece.

15. A method as defined in claim 14, further comprising the step of:
    providing the game piece with at least one region consisting essentially of a primary color.

16. A method as defined in claim 11, wherein the selectively camouflaged image comprises information relating to a contest.

17. A method as defined in claim 11, wherein the selectively camouflaged image comprises information relating to a promotion.

18. A method as defined in claim 11, wherein the selectively camouflaged image comprises information relating to a sweepstakes.

19. A method as defined in claim 11, wherein the game piece comprises a compact disc.

20. A method as defined in claim 11, wherein the web site is associated with a particular company, and wherein at least one of the game piece and the page of the web site includes information promoting the particular company's products and/or providing the individual with an opportunity to purchase the particular company's products.

* * * * *